United States Patent
Glissman et al.

(10) Patent No.: US 9,803,721 B2
(45) Date of Patent: Oct. 31, 2017

(54) HYBRID CABLE CARRIER CHAIN

(71) Applicant: Dynatect Manufacturing, Inc., New Berlin, WI (US)

(72) Inventors: Jared Glissman, Valparaiso, IN (US); Mark Zanolla, Hobart, IN (US); Jay O'Brien, Valparaiso, IN (US)

(73) Assignee: Dynatect Manufacturing, Inc., New Berlin, WI (US)

( * ) Notice: Subject to any disclaimer, the term of this patent is extended or adjusted under 35 U.S.C. 154(b) by 0 days.

(21) Appl. No.: 15/425,578

(22) Filed: Feb. 6, 2017

(65) Prior Publication Data

US 2017/0227090 A1 Aug. 10, 2017

Related U.S. Application Data

(60) Provisional application No. 62/291,250, filed on Feb. 4, 2016.

(51) Int. Cl.
  *F16G 13/16* (2006.01)

(52) U.S. Cl.
  CPC .................................. *F16G 13/16* (2013.01)

(58) Field of Classification Search
  CPC .............................. F16G 13/16; H02G 11/006
  USPC ....................................................... 59/78.1
  See application file for complete search history.

(56) References Cited

U.S. PATENT DOCUMENTS

| | | | |
|---|---|---|---|
| 3,646,752 A | 3/1972 | Kampfer | |
| 3,955,434 A | 5/1976 | Henning | |
| 4,412,609 A | 11/1983 | Schieve | |
| 4,626,233 A * | 12/1986 | Moritz | F16G 13/16 474/206 |
| 4,669,507 A | 6/1987 | Moritz | |
| 4,852,342 A | 8/1989 | Hart | |
| 4,885,908 A | 12/1989 | Stohr | |
| 5,184,454 A | 2/1993 | Klein et al. | |
| 5,489,202 A | 2/1996 | Eisinger | |
| 5,649,415 A | 7/1997 | Pea | |
| 5,711,144 A | 1/1998 | Pea | |
| 5,771,676 A * | 6/1998 | Komiya | H02G 11/006 248/49 |
| 6,029,437 A | 2/2000 | Hart | |
| 6,161,372 A * | 12/2000 | Wehler | F16G 13/16 249/49 |
| 6,349,534 B1 * | 2/2002 | Zanolla | H02G 11/006 248/49 |
| 6,789,383 B1 | 9/2004 | Plush et al. | |
| 7,150,351 B2 | 12/2006 | Wiejack-Symann | |
| 7,334,388 B2 | 2/2008 | Eckl et al. | |

(Continued)

FOREIGN PATENT DOCUMENTS

EP 1463176 9/2004
WO WO9523310 8/1995

*Primary Examiner* — David B Jones
(74) *Attorney, Agent, or Firm* — Andrew C. Landsman; Godfrey & Kahn, S.C.

(57) ABSTRACT

A cable carrier chain having link sections that include metal and plastic portions to allow the chain to operate at high velocity yet also be suitable for high acceleration and deceleration and/or heavy load applications. The metal portions are "free floating" when the chain rotates around a pivot point to allow the plastic portions to flex, but become "locked out" when the chain is no longer rotating to provide sufficient strength to support the load of the chain.

6 Claims, 6 Drawing Sheets

(56) References Cited

U.S. PATENT DOCUMENTS

| | | |
|---|---|---|
| 7,441,397 B2 | 10/2008 | Hart |
| 7,669,402 B2 | 3/2010 | Blase |
| 7,877,978 B2 * | 2/2011 | Heppner ................ F16G 13/16 248/49 |
| 8,256,722 B2 | 9/2012 | Krastev |
| 8,453,424 B2 * | 6/2013 | Jostmeier ................ F16G 13/16 248/49 |
| 2005/0079941 A1 | 4/2005 | Perez |
| 2007/0017199 A1 | 1/2007 | Saiki et al. |
| 2014/0093075 A1 | 4/2014 | Wang |

* cited by examiner

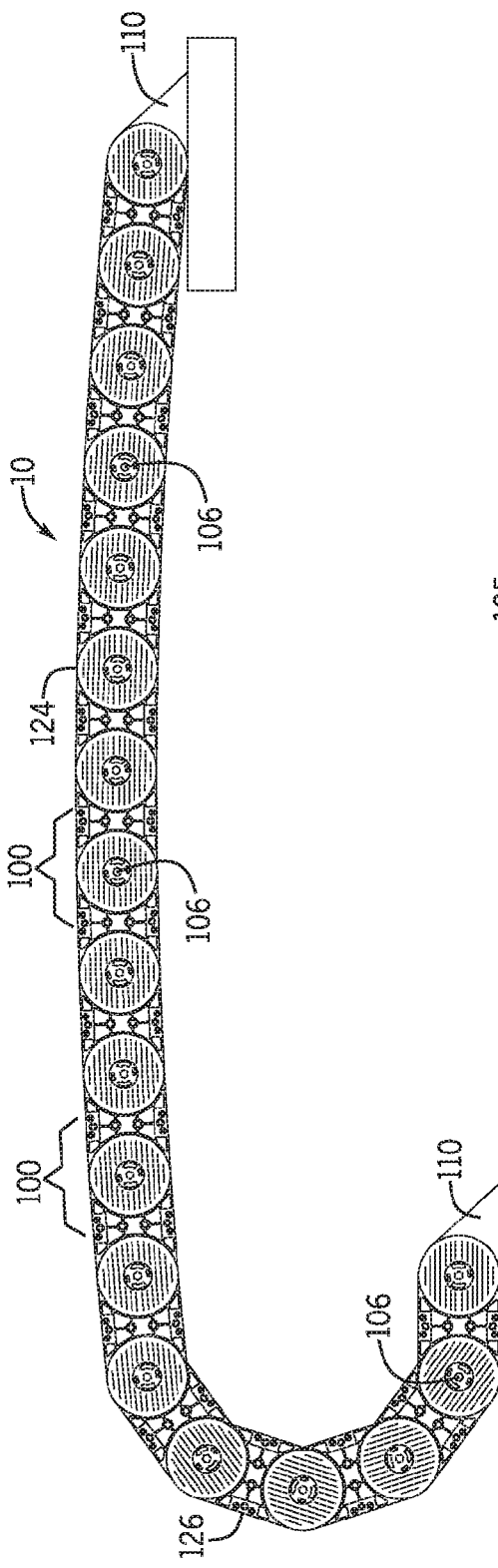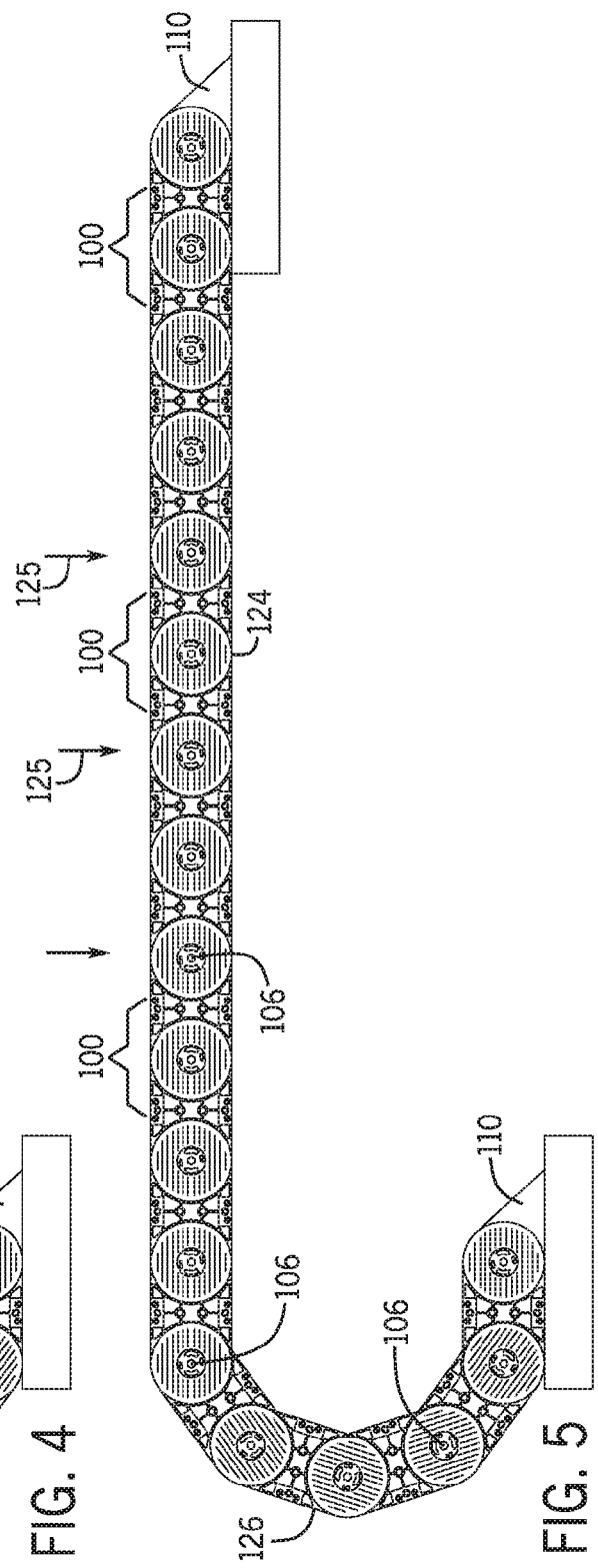

HYBRID CABLE CARRIER CHAIN

CROSS-REFERENCE TO RELATED APPLICATION AND PRIORITY CLAIM

This application is based on and claims priority to U.S. Provisional Patent Application No. 62/291,250 filed on Feb. 4, 2016, which is incorporated herein by reference in its entirety for all purposes.

FIELD OF THE INVENTION

The present invention relates generally to the field of cable carrier chains. More particularly, the present invention relates to a cable carrier chain having a plastic portion and a steel portion.

BACKGROUND

Cable carrier chains, also called drag chains, energy chains, or cable chains surround and guide flexible cables or hoses. Typically, cable carrier chains are used in connection with articulated machinery which may or may not be automated. Cable carrier chains reduce wear and stress on the cables or hoses, prevent entanglement, and improve operator safety. Cable carrier chains come in a wide variety of sizes, from applications in small devices, up to very large industrial applications. Typical cable carrier chains have a rectangular cross section forming a cavity through which cables, hoses, or other flexible materials can pass. Spacer bars may be included along the length of the chain that can be opened to allow cables to be inserted or removed. Cable carrier chains may also include internal separators to separate the cables.

Cable carrier chains may be configured to bend or articulate in a wide variety of directions. Many cable carrier chains only permit bending in one direction, however, to further control the movement of the enclosed cables to prevent tangling or crushing of the cables.

Cable carrier chains are typically made of either metal or plastic, depending on the needs of the application. Size and material selection are also important to consider when selecting the right cable carrier chain for a particular application.

Metal chain sections are often made of steel and/or aluminum and distribute large stress and strain forces without buckling or shearing because of the chain section material has high mechanical strength properties. These forces are produced by moment forces acting on the chain sections. These moment forces can occur due to long unsupported spans, heavy distrusted loads, or high accelerations and decelerations acting on the chain sections. As described above, such unsupported spans often occur because the cable carrier chain may only permit bending in one direction.

Plastic chain sections absorb high impact forces without permanent deformation due to the high level of elasticity of plastic compared to metal. These impact forces are often the result of the chain sections being pushed and/or pulled at high velocities. However, the higher elasticity of plastic chain sections as compared to metal chain sections make them typically unable to reliably support long unsupported spans or heavy loads without unacceptable wear or, in some cases, failure.

No solution currently exists that combines the qualities of both metal and plastic cable carrier chains. As such, there is a need for a cable carrier chain that incorporates both metal and plastic parts to take advantage of the desirable properties of each type of chain.

SUMMARY

The present invention is a cable carrier chain having a cavity through which cables or hoses can pass. The cable carrier chain includes a plurality of alternating male pivot sections and female pivot sections, wherein the male and female pivot sections are rotatably and removably attached to each other to form a chain.

Each male pivot section has two side portions, which are separated by at least one spacer bar. A male support plate is removably attached to each side portion and includes at least one inner bearing flange. The side portion is made of a different material than the male support plate.

Similarly, each female pivot section has two side portions, which are separated by at least one spacer bar. A female support plate is removably attached to each side portion and includes at least one arcuate slot. Again, the side portion is a different material than the female support plate.

Each of the side portions includes at least one damper block that selectively engages at least one damper block on an adjacent side portion. The damper blocks are positioned to allow limited rotation of the pivot sections by engaging an adjacent damper block. Further, the damper blocks are positioned to engage an adjacent damper block before the bearing flanges engage the arcuate slots. Finally, the damper blocks made of a material that allows the damper bocks to elastically deflect under load until the bearing flanges engage inner arcuate slots.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

BRIEF DESCRIPTION OF THE DRAWINGS

FIG. 4 is a side view of a hybrid cable carrier chain in accordance with one embodiment of the present invention shown in an unlocked position;

FIG. 5 is a side view of the hybrid cable carrier chain of FIG. 4 shown in a locked position;

DETAILED DESCRIPTION

The hybrid cable carrier chain of the present invention provides a solution that has the benefits of both metal and plastic chains, particularly in high velocity and/or high acceleration-deceleration application. The hybrid cable carrier chain is able to benefit from the properties of both metal and plastic chains by using chain links that include both plastic and metal components and selectively either material when desirable.

Figure 1:
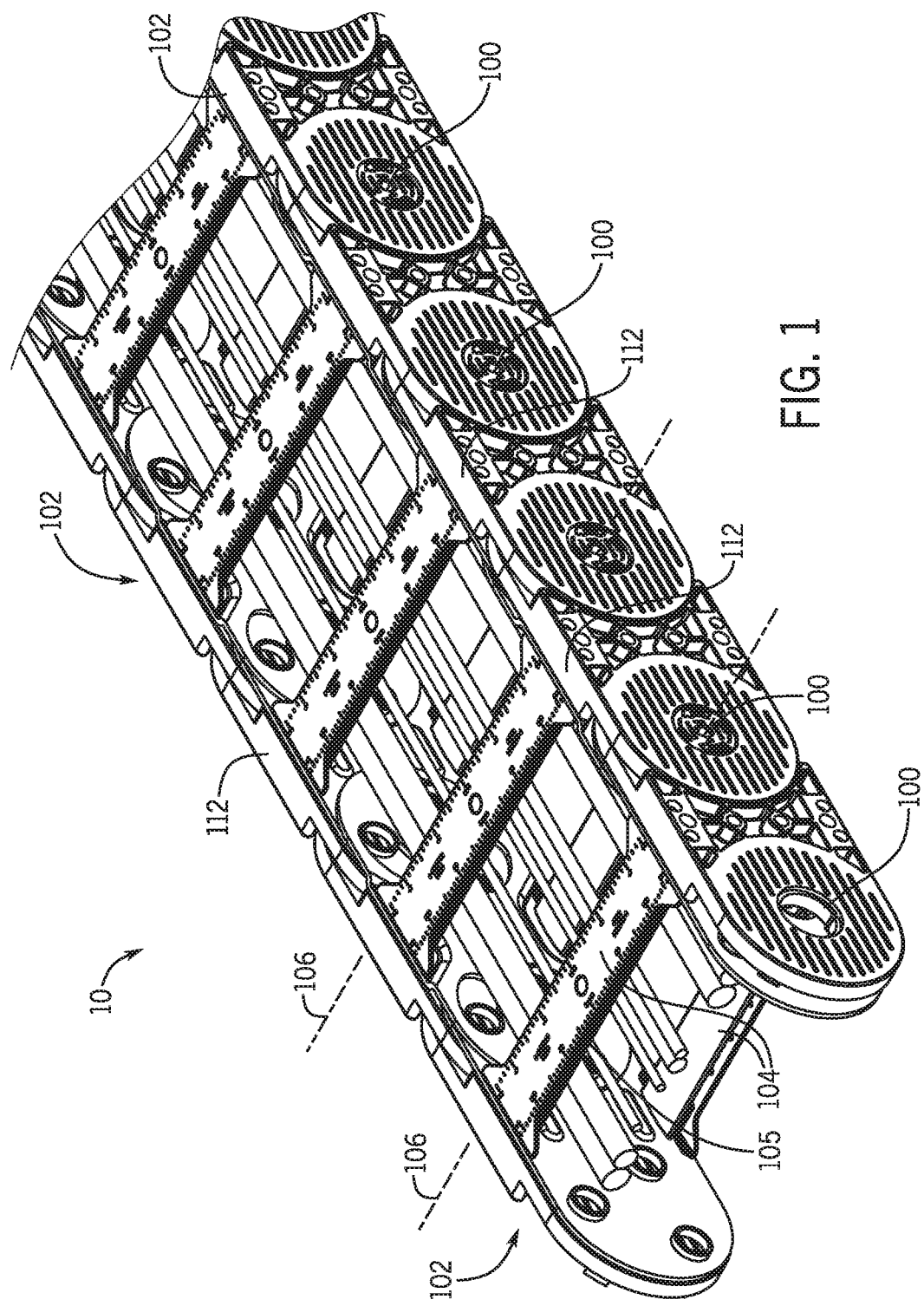
FIG. 1 is a perspective view of a portion of a hybrid cable carrier chain in accordance with the invention.

FIGS. 1-12 show one embodiment of a hybrid cable carrier chain 10 in accordance with the invention. As shown in FIG. 1, hybrid carrier chain 10 includes a plurality of pivot sections 100 that are connected to each other to form a chain. In the embodiment shown, two pivot sections 100 are integrally formed into links 101. Each link 101 includes sides 102 that are connected to each other by spacer bars 104, to form a cavity 105 through which cables, hoses, or any other flexible material can pass. The spacer bars 104 may be selectively opened or closed to allow cables to be inserted or removed from cavity 105. The links 101 and spacer bars 104 may be of any suitable size or length without departing from the invention. In the embodiment shown, each pivot section 100 includes a pivot axis 106. When pivot axes 106 of two adjacent pivot sections 100 are aligned, the pivot sections may be secured to each other using a locking hub 108. At either end of the chain 10, the last pivot section 100 may also be attached to an anchor point 110 (see FIGS. 4-5).

Figure 2:
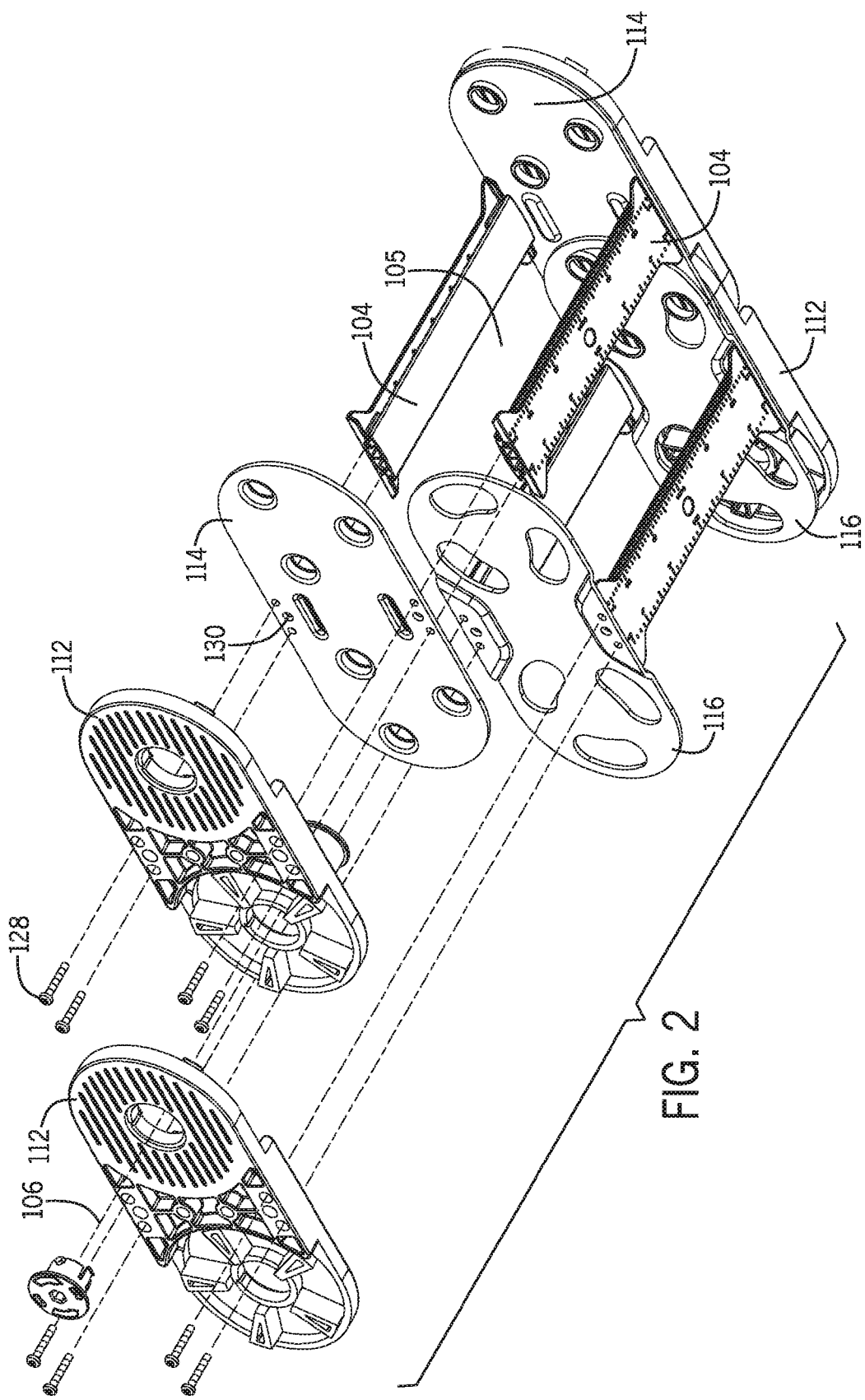
FIG. 2 is an exploded perspective view of a portion of the hybrid cable carrier chain of FIG. 1.

Turning now to FIG. 2, an exploded view of two adjacent links 101 is shown. Unlike typical chains where each link is identical, the present invention includes side portions 112 and alternating male and female support plates 114, 116. In the embodiment shown, side portions 112 are solid parts made of glass filled nylon but may alternatively be made of multiple parts of any other suitable material without departing from the invention. A plurality of damper blocks 122 extends from the side portions 112 and are positioned around pivot axes 106. When side portions 112 are rotationally attached to each other to form a chain 10, damper blocks 122 on adjacent pivot sections 100 align so that the pivot sections 100 can rotate a limited distance until adjacent damper blocks engage each other. Although damper blocks 122 have the general shape of pie slices in the present embodiment, the damper blocks may be any suitable shape without departing from the invention.

Figure 3:
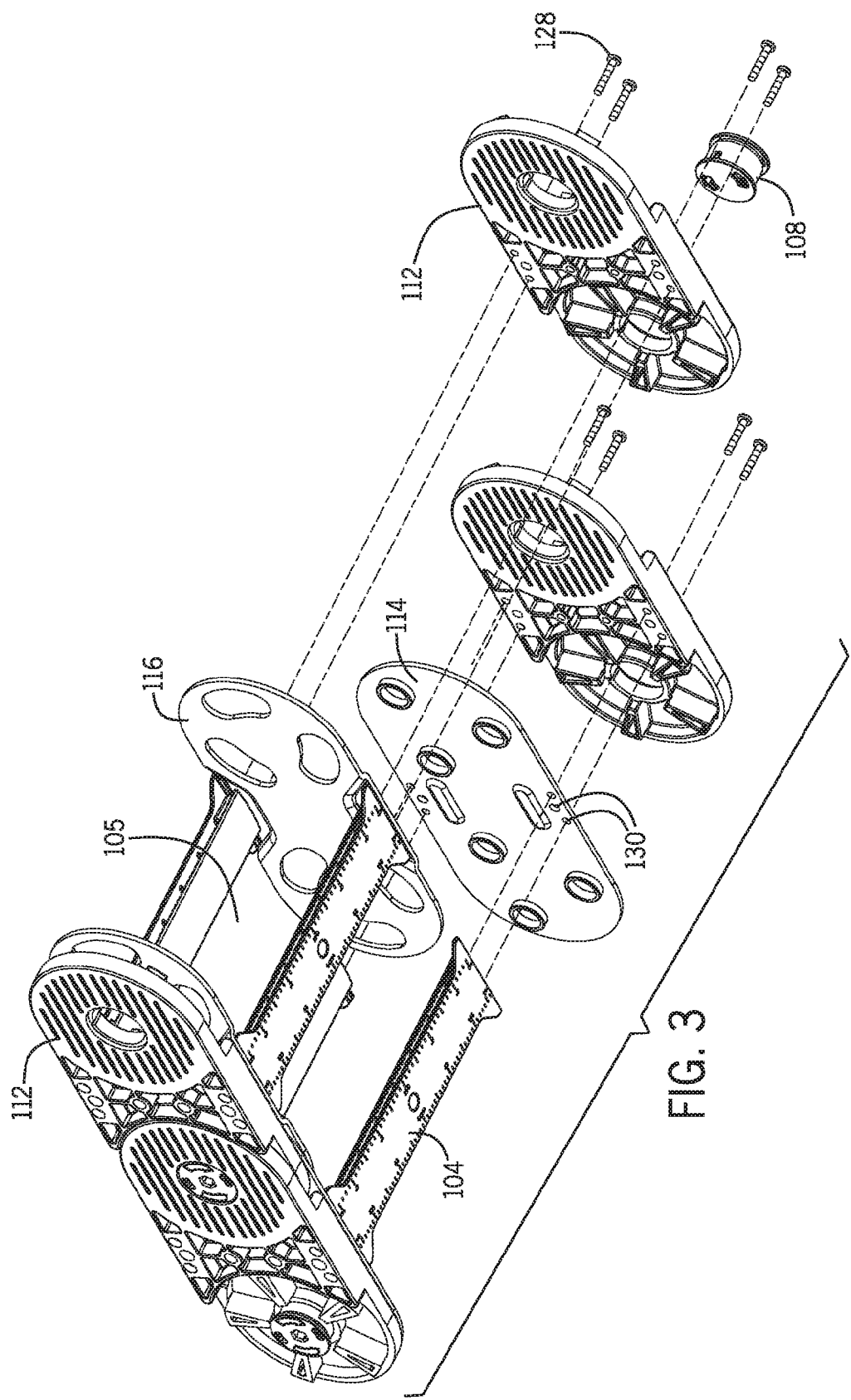
FIG. 3 is an opposite side exploded perspective view of the hybrid cable carrier chain of FIG. 2.

Support plates 114, 116 are removably attached to the links 101 by a plurality of fasteners 128. As shown in FIGS. 2-3, support plates 114, 116 are substantially flat and include a plurality of mounting holes 130 though which fasteners 128 may pass. Threaded inserts 132 are included in side portion 112 that correspond to the locations of mounting holes 130. Of course, alternative fasteners or fastening methods may be used to attach the support plates 114, 116 to side portion 112 without departing from the invention. In the embodiment shown, support plates 114, 116 are made of steel, but any suitable material may alternatively be used without departing from the invention.

Male support plate 114 further includes a plurality of bearing flanges 134 that are positioned around the pivot axes 106. In the embodiment shown, three bearing flanges 134 are positioned concentrically around each pivot axis 106, but additional or fewer bearing flanges may alternatively be used without departing from the invention. Further, the bearing flanges may alternatively be positioned non-concentrically around pivot axis 106. As shown, the bearing flanges 134 are circular but any other suitable shape may also be used. Further, the bearing flanges 134 are punched through the male support plate 114, but the holes shown in the present embodiment are not necessary to practice the invention.

Female support plate 116 includes a plurality of arcuate slots 136 that surround the pivot axes 106. The location of the arcuate slots 136 corresponds to the position of the bearing flanges 134, i.e., concentrically around pivot axis 106 in the present embodiment. When two links 101 are attached, the support plates 114, 116 are aligned so that the bearing flanges 134 travel through the arcuate slots 136 and selectively engage the sides of the arcuate slots.

In alternative embodiments, the features of the support plates 114, 116 may be combined so that all links 101 could be identical. For example, rather than each support plate providing only bearing flanges 134 or arcuate slots 136, respectively, each plate could alternatively include bearing flanges 134 at one of the pivot sections 100 and arcuate slots 136 at the other pivot section. As such, any suitable combination of bearing features could be included in the support plates 114, 116 without departing from the invention.

FIGS. 4 and 5 show a hybrid carrier chain 10 supported between two anchor points 110. The hybrid carrier chain 10 includes an unsupported section 124 and a curved section 126. FIG. 4 shows the unsupported section 124 in an "unlocked" position. When the cable carrier chain 10 is in the unlocked position, the support plates 114, 116 are "free floating." Pivot sections 100 are also in the unlocked position whenever the pivot sections are rotating around the pivot axes 106. In the unlocked position, none of the load 125 is supported by support plates 114, 116.

FIG. 5 shows the unsupported section 124 in a "locked" position. In the locked position, the load 125 of the unsupported section has caused the damper blocks 122 to deflect slightly, which causes the bearing flanges 134 to engage the arcuate slots 136, thereby transferring a portion of the load from the damper blocks 122 to the support plates 114, 116. At this point the moment load acting on the chain sections is shared disproportionately between the damper blocks 122 and the support plates 114, 116, thereby allowing the cable carrier chain 10 to handle greater moment loads caused by high accelerations-decelerations, and/or heavy loads. Importantly, before the load is transferred to the support plates the high elasticity of the damper blocks 122 relative to the support plates 114, 116 will dampen and disperse any impact forces before they act on the support plates. This prevents the support plates 114, 116 from being deformed due to impact forces.

FIGS. 6-12 show in greater detail the interplay between the damper blocks 122 and the support plates 114, 116 at different positions. FIGS. 6-12 all show two pivot sections 100 that are attached at a pivot axis 106 by a locking hub 108.

Figure 6:
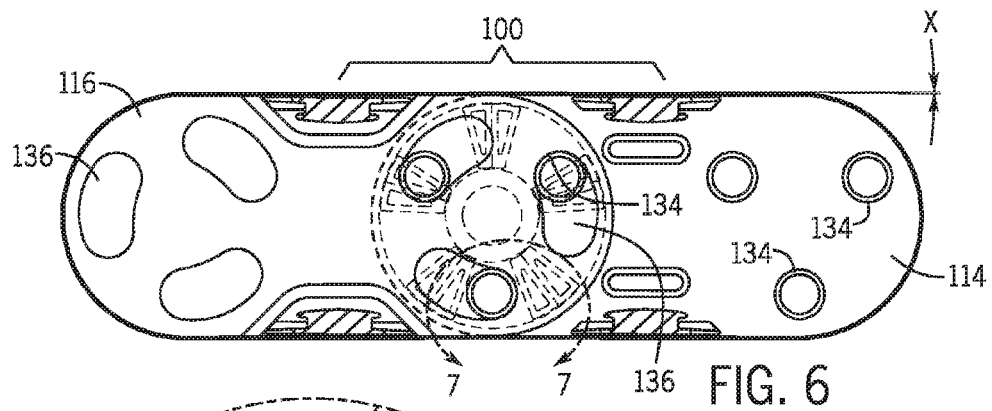
FIG. 6 is a front view of the interiors of two links of a hybrid cable carrier chain in accordance with one embodiment of the invention shown in an unlocked position.
Figure 7:
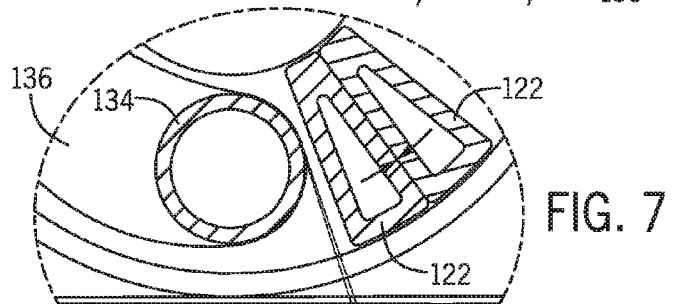
FIG. 7 is a detail view of the interiors of the links of the hybrid cable carrier chain of FIG. 6 taken generally along the line 7-7 in FIG. 6.

FIGS. 6 and 7 show pivot sections 100 in an unlocked position. The pivot sections 100 are positioned X° relative to each other. As shown in FIG. 7, in the unlocked position, damper blocks 122 on the pivot sections 100 are engaged and supporting a portion of the load, but bearing flange 134 is not engaged with arcuate slot 136 and the support plates 114, 116 are not bearing any of the load.

Figure 8:
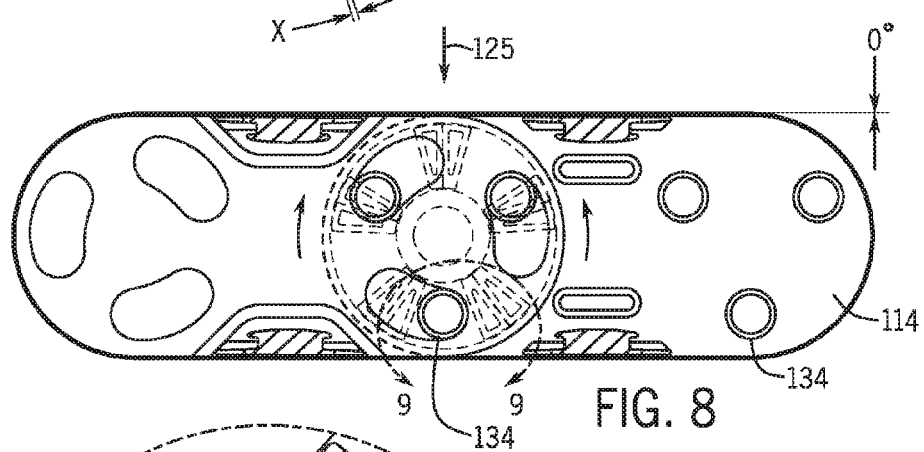
FIG. 8 is another front view of the interiors of two links of the hybrid cable carrier chain of FIG. 6 shown in a locked position.
Figure 9:
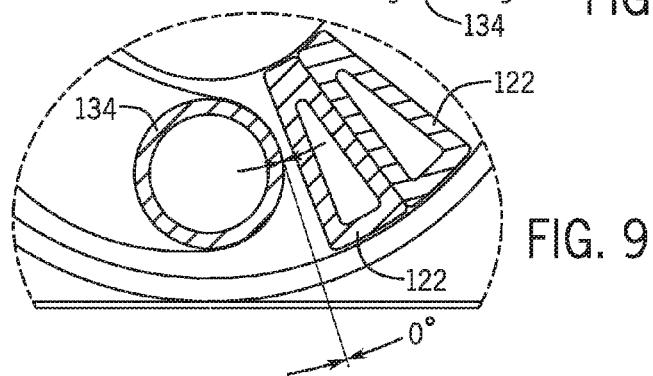
FIG. 9 is a detail view of the interiors of the links of the hybrid cable carrier chain of FIG. 8 taken generally along the line 9-9 in FIG. 8.

FIGS. 8 and 9 show pivot sections 100 in the locked position. In the embodiment shown, the pivot sections 100 are positioned parallel to each other, but the pivot sections 100 could be locked out at any desired angle without departing from the invention. When the pivot sections 100 are in the locked position, bearing flange 134 engages arcuate slot 136 to bear a portion of the load borne by the cable carrier chain 10. Damper blocks 122 remain engaged, but have deflected slightly to allow the support plates 114, 116 to bear a portion of the load.

Figure 10:
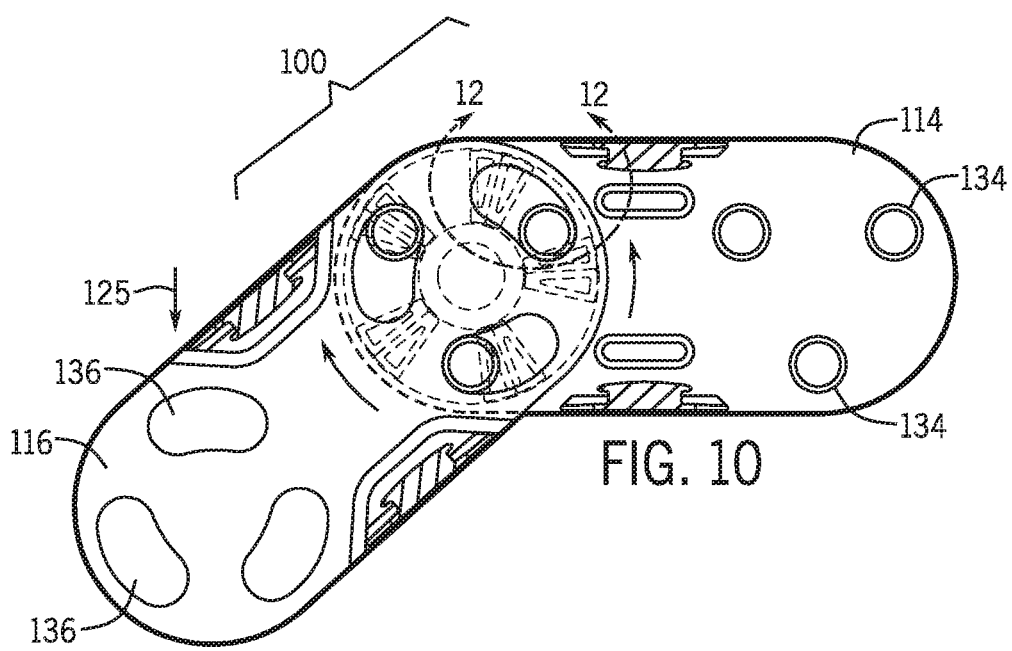
FIG. 10 is another front view of the interiors of two links of a hybrid cable carrier chain in accordance with one embodiment of the invention shown in an unlocked position.
Figure 11:
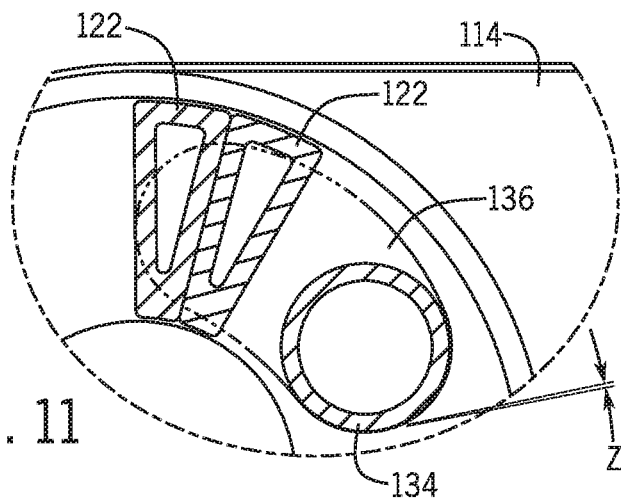
FIG. 11 is a detail view of the interiors of the links of the hybrid cable carrier chain of FIG. 10 taken generally along the line 12-12 in FIG. 10.
Figure 12:
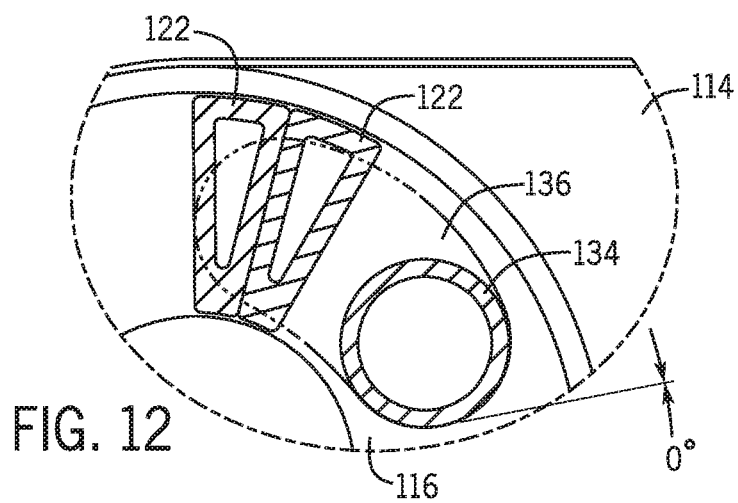
FIG. 12 is another detail view of the interiors of the links of the hybrid cable carrier chain of FIG. 10 taken generally along the line 12-12 in FIG. 10 showing the links in a locked position.

FIGS. 10-12 also show pivot sections 100 in a locked position consistent with curved section 126 as shown in FIGS. 4 and 5. Just as in the locked position described above and shown in FIGS. 6-9, as the pivot sections 100 rotate relative to each other in curved section 126, damper blocks 122 begin to engage before the bearing features of the support plates 114, 116 engage. Damper blocks 122 then deflect slightly to allow bearing flange 134 to engage arcuate slot 136, again causing the support plates 114, 116 to bear a portion of the load 125.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. A cable carrier chain having a cavity thought which cables can pass comprising:
   a plurality of alternating male pivot sections and female pivot sections, wherein the male and female pivot sections are rotatably attached to each other to form a chain;
   each male pivot section comprising two side portions, separated by at least one spacer bar, each side portion removably attached to a male support plate, the male support plate including at least one inner bearing flange, wherein the side portion is a different material than the male support plate;
   each female pivot section comprising two side portions, separated by at least one spacer bar, each side portion removably attached to a female support plate, the female support plate including at least one arcuate slot, wherein the side portion is a different material than the female support plate;
   each of the side portions in the male pivot section and the female pivot section further including at least one damper block that selectively engages at least one damper block on an adjacent side portion;
   the damper blocks positioned to allow limited rotation of the pivot sections by engaging an adjacent damper block;
   the damper blocks further positioned to engage an adjacent damper block before the bearing flanges engage the arcuate slots; and
   the damper blocks made of a material that allows the damper bocks to elastically deflect under load until the bearing flanges engage inner arcuate slots.

2. The hybrid cable carrier chain of claim 1, wherein:
   the male support plates include a plurality of bearing flanges positioned concentrically around the pivot axis; and
   the female support plates include a plurality of arcuate slots positioned concentrically around the pivot axis.

3. The hybrid cable carrier chain of claim 1, wherein the plurality of pivot sections are rotatably attached to each other by locking hubs.

4. The hybrid cable carrier chain of claim 1 wherein the side portions are made of glass filled nylon.

5. The hybrid cable carrier chain of claim 1, wherein the male and female support plates are made of steel.

6. A method of managing at least one cable using a hybrid cable carrier chain having a cavity, the method comprising:
   rotatably attaching a plurality of alternating male pivot sections and female pivot sections to form a chain;
   each male pivot section comprising two side portions, separated by at least one spacer bar, each side portion removably attached to a male support plate, the male support plate including at least one inner bearing flange, wherein the outer portion is a different material than the male support plate;
   each female pivot section comprising two side portions, separated by at least one spacer bar, each side portion removably attached to a female support plate, the female support plate including at least one arcuate slot, wherein the outer portion is a different material than the female support plate;
   each of the side portions further including at least one damper block that selectively engages at least one damper block on an adjacent side portion;
   the damper blocks positioned to allow limited rotation of the pivot sections by engaging an adjacent damper block;
   the damper blocks further positioned to engage an adjacent damper block before the bearing flanges engage the arcuate slots; and
   the damper blocks made of a material that allows the damper bocks to elastically deflect under load until the bearing flanges engage inner arcuate slots;
   opening the spacer bars;
   inserting at least one cable into the cavity; and
   closing the spacer bars.

\* \* \* \* \*